United States Patent [19]
Weiss et al.

[11] Patent Number: 5,269,732
[45] Date of Patent: Dec. 14, 1993

[54] VEHICLE TRANSMISSION WITH RAVIGNEAUX CENTRAL DIFFERENTIAL

[75] Inventors: Heinz Weiss, Bensheim; Heiko Kiefer, Mannheim, both of Fed. Rep. of Germany

[73] Assignee: Deere & Company, Moline, Ill.

[21] Appl. No.: 929,645

[22] Filed: Aug. 12, 1992

[30] Foreign Application Priority Data

Aug. 17, 1991 [DE] Fed. Rep. of Germany ....... 4127266

[51] Int. Cl.$^5$ ............................................. F16H 3/08
[52] U.S. Cl. ................................... 475/249; 475/252; 475/205
[58] Field of Search ............... 475/198, 204, 205, 220, 475/221, 248, 249, 252, 329, 332, 338, 339, 340, 341, 342; 180/249, 248

[56] References Cited

U.S. PATENT DOCUMENTS

| | | | |
|---|---|---|---|
| 3,482,469 | 12/1969 | Mori | 475/205 X |
| 3,903,757 | 9/1975 | Hau et al. | 475/204 X |
| 4,677,873 | 7/1987 | Eastman et al. | 475/252 X |
| 4,719,985 | 1/1988 | Zauser | 475/225 X |
| 4,722,246 | 2/1988 | Gaus et al. | 475/249 |
| 5,078,660 | 1/1992 | Williams et al. | 475/252 X |

FOREIGN PATENT DOCUMENTS

| | | |
|---|---|---|
| 348878 | 2/1977 | Austria . |
| 0113490 | 1/1983 | European Pat. Off. . |
| 0112421 | 7/1984 | European Pat. Off. . |
| 0411812 | 2/1991 | European Pat. Off. . |
| 0424147 | 4/1991 | European Pat. Off. . |
| 3701843 | 9/1988 | Fed. Rep. of Germany . |
| 2592842 | 7/1987 | France . |
| 9212361 | 7/1992 | World Int. Prop. O. . |

OTHER PUBLICATIONS

Patent Abstracts of Japan, vol. 14, No. 75 (M-0934), Feb. 13, 1990 and JP-A-12 93 228 (Toyota Motor Corp.), Nov. 27, 1989.
Patent Abstracts of Japan, vol. 10, No. 181 (M-492), June 25, 1986 and JP-A-61 027 339 (Nissan Motor Co. Ltd.), Feb. 6, 1986.
Looman, J.: Zahnradgetriebe, 2.Aufl., Berlin, Heidelberg, New York: Springer-Verlag 1988, S. 315-390.

*Primary Examiner*—Leslie A. Braun
*Assistant Examiner*—Khoi Q. Ta

[57] ABSTRACT

A vehicle transmission, particularly for industrial and agricultural vehicles, includes a speed change gearset (gear and range) and a central differential for distributing the gearset output to the front and rear axles of the vehicle. The central differential is formed of a Ravigneaux gearset to reduce the dimensions of the transmission and to minimize the costs and technical resources required to produce it. The Ravigneaux gearset distributes the torque of a gear output shaft to the front and rear axles according to the ratio of the two planetary sun gear diameters. Preferably, the end stage of the speed change gearset is formed by a further gearset, and the planet carriers of both Ravigneaux gearsets are formed as a common structural member carrying the planets of both Ravigneaux gearsets.

9 Claims, 5 Drawing Sheets

VEHICLE TRANSMISSION WITH RAVIGNEAUX CENTRAL DIFFERENTIAL

BACKGROUND OF THE INVENTION

1. Field of the Invention

The invention concerns a vehicle transmission, in particular for utility and agricultural vehicles, in which the speed changing arrangement (for example, a multi-speed gearbox and a range gearbox) is followed by a central differential which divides the gearbox output power between the front axle and the rear axle. Agricultural tractors of this type frequently have their front and rear axles fitted with unequally large tires.

2. Description of the Related Art

Despite varied proposals, current four wheel drives for agricultural tractors are not entirely satisfactory. With a rigid drive to the front and rear axles with zero overrun for the front axle, field operation results in propulsion forces that are too low and negative propulsion forces when operating around curves.

One way to reduce this effect is to increase the overrun to 2% or more, but there are still problems in operation around curves. As the steering angle increases, the front wheel on the inside of the curve increasingly loses its overrun and the slip changes from positive to negative. This means that the wheel is retarded and no longer propels the vehicle. In operation around curves this means the turning radius actually increases when the mechanical front wheel drive (MFWD) is engaged. In operation on the road the result is increased tire wear and, in the field, shearing of the grass shoulder. This is particularly apparent in the tight turns approaching the headland of a field.

One possible solution to this problem is to disable the front wheel drive for on the road operation. Unfortunately, this in turn means that the front axle cannot be utilized for propulsion or engine braking.

In theory, this disadvantage could be partially avoided by automatically engaging the front wheel drive during braking when the gearbox is in the road operation range. However, this might result in uncontrollable operating conditions.

Further attempts at solving the problem include adding steps in the gear ratios for the front wheel drive, while disabling the outer front wheel using a non-slip differential or the like. This has the disadvantages that it strains the transmission to the front wheel, may cause difficulty in controlling shifting between pulling and braking, and it limits drive to only three of the four wheels of the tractor.

EP-B1-0 112 421 and EP-B1-0 113 490 have disclosed vehicle transmissions of the aforementioned type with central differentials, by which the engine torque can be divided in a predetermined ratio between the front axle and the rear axle. This avoids strains between front and rear axles.

It is known to use spur gear planetary gearsets as central differential gears, but they require considerable radial space with their planets, carriers and ring gears. Since their gear ratio depends largely on the conditions of the installation, the central differentials limit the design possibilities for the vehicle transmission. If the central differential is applied in connection with a synchronized gearbox, for example, its radial dimensions must be compatible with the established shaft spacing of the synchronized gearbox. This requirement is not always met easily, particularly with compact gearboxes with high power density.

SUMMARY OF THE INVENTION

It is the object of the present invention to provide a vehicle transmission of the aforementioned type in which the problems described above are overcome. In particular the central differential should not unduly limit the spacial design constraints of the vehicle transmission. The vehicle transmission should require relatively little technical sophistication and permit manufacture at low cost.

These and other objects are achieved according to the present invention by using as the central differential a gearset (referred to herein as a "Ravigneaux gearset") having two co-axial sun gears, a single planetary carrier, and two sets of planetary gears mounted to the planetary carrier with the gears of each set of planetary gears meshing with the gears of the other set of planetary gears and with one of the sun gears. The output torque of the gearbox output is divided corresponding to the ratio of the radii of the two sun gears of the Ravigneaux gearset for transmission to the front and rear axles.

In comparison to known central differentials, a Ravigneaux gearset can be applied in relatively small radial dimensions, since the normal ring gear and overlapping input can be eliminated.

This advantage is particularly evident in an embodiment in which the gearbox transmission output is transmitted to the Ravigneaux gearset coaxially through its planet carrier and in which the output of the Ravigneaux gearset is through its two sun gears. With such a structure and with the central differential arranged in the primary driveline of the vehicle, the small radial dimensions of the Ravigneaux gearset make for a compact design of the vehicle transmission.

If the central differential is operated at its design point, then the coupled planetary gears do not rotate with respect to the planet carrier. This in turn means that the output shafts to the front and rear axles rotate synchronously and carry torques that correspond to the static gear ratio. Differential action takes place in operation around curves when the rear wheels force the front wheel to rotate faster because it is running on a larger circle. Front and rear axles then operate according to their designed torque ratios.

In view of the differing application requirements and load conditions of the vehicle, in particular an agricultural tractor, this ideal condition cannot be attained in each case. In plowing, for example, 80 to 100% of the engine torque must be delivered by the rear wheels, while for transport operations a division of 35% to the front axle and 65% to the rear axle would be preferred.

Therefore a preferred embodiment of the invention proposes that the central differential be selectively shiftable by a clutch arranged between the operating shafts of the Ravigneaux gearset for the front and rear axles. With the clutch in differential mode, the central differential free-wheels and the torque is divided between the front and rear axles in proportion to the radii of the sun gears. With the clutch in block mode, the front and rear wheel drives are coupled to each other so that the central differential is locked and becomes ineffective. In block mode, the torque division is the result of the transmission capabilities of the wheels and depends on the conditions of the ground (for example, whether the vehicle is on a non-skid surface or slippery ground). In block mode, the drive relations therefore correspond to those of known mechanical front wheel drive (MFWD) clutch systems, where the front and rear axles are sometimes rigidly connected to the output shaft of the drive.

It is particularly preferable to arrange the clutch between the two output shafts to extend coaxially from one side of the central differential.

In contrast to the previously known MFWD drives, in which the all-wheel drive must be disengaged under certain operating conditions, for example, at high speeds and in sharp curves, the all-wheel drive according to present the invention can remain engaged at all times. A control arrangement to engage and disengage the all-wheel drive therefore is unnecessary.

In agricultural tractors, the front wheels typically are significantly smaller than the rear wheels. This means they have a smaller contact area and therefore exhibit greater slip than the rear wheels. Compensation also is necessary for the differing rolling distances around curves. It therefore is advantageous that to design drive to the front axle with a certain overrun (2 to 5%) with respect to the rear wheels. The overrun can be incorporated into the driveline following the central differential (transmission compensation). With such a built in overrun, the block mode described above results in the same operating conditions as in known agricultural tractors.

A further advantage of building in an overrun for the front axle is that it means that whenever the central differential is operating in differential mode, it constantly rotates at a relative speed, even in travel straight ahead. Due to this constant differential compensation, the gears of the differential rotate relative to each other. This avoids transmission of the torque primarily through one pair of gear teeth and excessive wear of those teeth.

A control arrangement is appropriately provided that can automatically lock the central differential in critical operating conditions, for example, high slip due to front wheels on ice. Thus the positive connection is not lost either in driving or in braking.

The clutch can be designed advantageously as a safety clutch for the front axle. This can be attained, for example, by the selection of the number of clutch disks and the pressure of the clutch, where the slip torque of the clutch is so designed that no more than the torque capacity of the front axle is transmitted.

A particularly preferred embodiment of the invention provides that the final stage of the speed changing arrangement include at least one planetary gear whose gear ratio can be shifted. This planetary gear configured as gearbox end stage acts as range gear following a multi-speed gearbox. Preferably this controllable planetary gear also contains a Ravigneaux gearset.

A very compact configuration in which energy is transferred in the smallest space and at low manufacturing cost is attained by integrating the central differential and the controllable planetary gearset into a combined circulating gear drive. Here both gearsets preferably are provided with common components. A common planet carrier is most appropriate here to carry the planet gears of both the controllable planetary gear and the central differential. Preferably the controllable planetary gear is provided with a driven sun gear, two ring gears and a planet carrier used as output. In addition a first clutch between the first ring gear and the gearbox housing and a second clutch between the sun gear and a second ring gear are arranged for shifting between two gear ratios. For example, actuating the first clutch may engage the field range, and the second clutch may engage a road range. Furthermore a third clutch may be arranged between the first ring gear and the second ring gear with which a reverse range may be engaged.

The main gearbox ahead of the final stage, for example, a multi-speed gearbox, is preferably a continuously variable gearbox, but may also be a shift operated synchronized gearbox or one that can be shifted under load. If the main gearbox uses a synchronized shifted gearset, a continuously variable gearset or a gearset that can be shifted under load, it produces an output torque through an output shaft to the final stage which, for example, is configured as a range gearset. With a continuously variable main unit, the range gearbox may, in addition, be driven by at least a second input shaft. Here there is a particular advantage in configuring the final stage of the gearset as a compound gearbox with at least two inputs. This makes it possible to design the complete vehicle transmission as a continuously variable, shift-controlled drive.

The advantage of a continuously variable gearbox as main drive over a synchronized gearbox or a gearbox shifted under load, lies in the fact that the shift components of the gear ratios to be shifted rotate at synchronous speeds at the shift point, so that no shocks occur during the shift such as those found in a gearbox shifted under load. On the other hand a synchronized gearbox cannot be shifted under load.

BRIEF DESCRIPTION OF THE DRAWINGS

The invention will be further described with reference to the drawings, in which.

DETAILED DESCRIPTION OF THE PREFERRED EMBODIMENTS

In the figures described in the following corresponding parts are designated by the same reference numerals.

Figure 1:
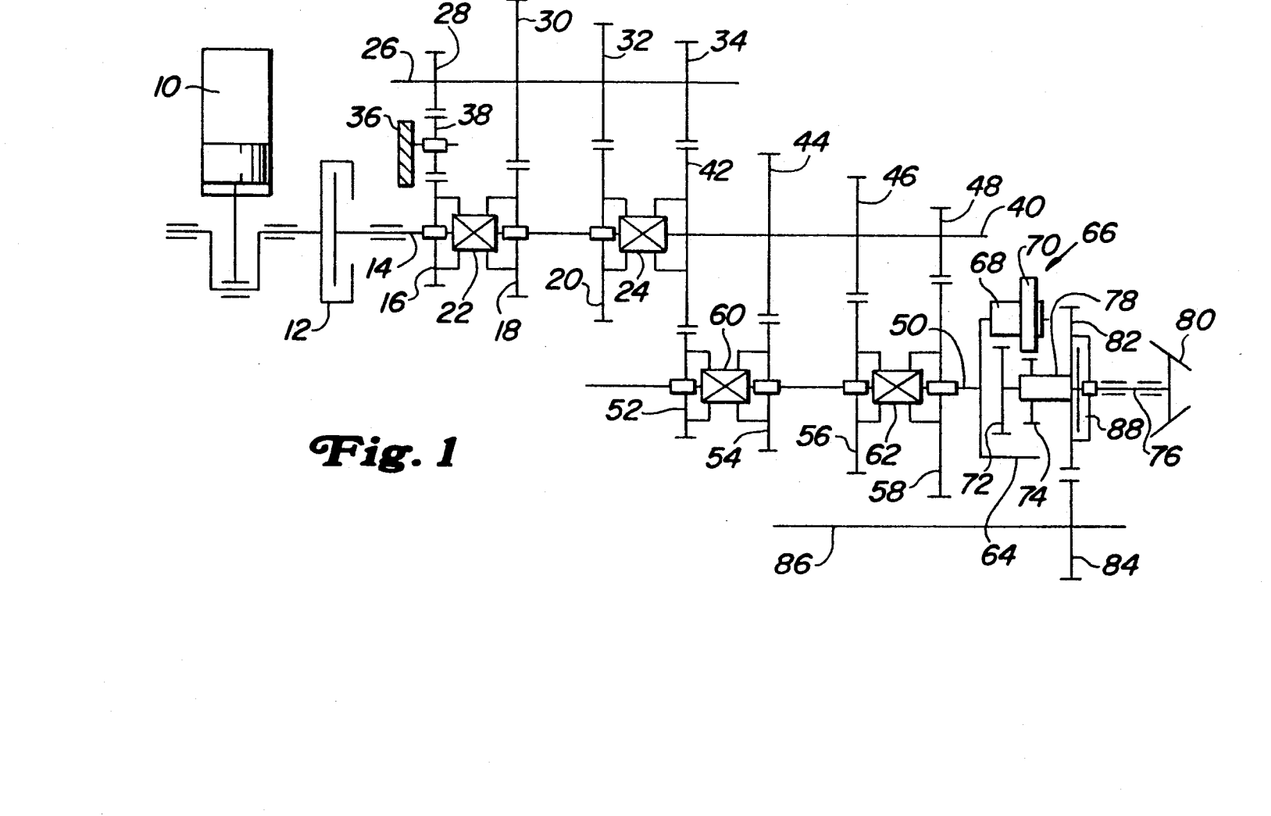
FIG. 1 shows a schematic view of a central differential coupled to a fully synchronized transmission according to the present invention.

The vehicle transmission shown in FIG. 1 is generally composed of a fully synchronized shifted gearbox, a fully synchronized range gearbox and a central differential. The internal combustion engine 10 of a vehicle, not shown in any further detail, is connected through a main clutch 12 to the gearbox input shaft 14 of the shifted gearbox on which free gears 16, 18, 20 are supported. Double-acting shift sleeves 22 and 24 can selectively connect the free gears 16, 18, 20 with the input shaft 14. A countershaft 26 carries four gears 28, 30, 32, 34, fixed against rotation, of which the second gear 30 and the third gear 32 mesh with the free gears 18 and 20 and form the first and second gear ratios, respectively, when engaged by the corresponding shift sleeves 22, 24. The first free gear 16 engages the fixed gear 28 of the countershaft 26 through a reverse gear 38 supported in the gearbox housing 36 and forms the reverse gear ratio.

The second shift sleeve 24 can connect the gearbox input shaft 14 with a range gearbox input shaft 40 which carries four fixed gears 42, 44, 46, 48, which results in the third gear ratio. The countershaft 26 and the range gearbox input shaft 40 are in constant mesh through the fixed gears 34 and 42.

A range gearbox output shaft 50 carries four free gears 52, 54, 56, 58 that mesh with the fixed gears 42, 44, 46, 48 on the range gearbox input shaft. They can be selectively connected by double-acting shift sleeves 60, 62 with the shaft 50, whereby four ranges can be selected.

In addition the range gearbox output shaft 50 supports the planet carrier 64 of a Ravigneaux gearset 66 which operates as central differential. The planet carrier 64 is fixed against rotation relative to the shaft 50 and supports a set of long planet gears 68 and a set of short planet gears 70. Each planet set may, for example, consist of three gears of which, however, only one gear 68, 70 is shown. In addition the Ravigneaux gearset 66 contains two sun gears 72, 74 whose coaxial output shafts 76, 78, extend through the Ravigneaux gearset 66.

The output shaft 76 of the larger sun gear 72 is connected to a bevel gear 80 of a differential gear of the rear axle, not shown. The output shaft 78 of the smaller sun gear 74 is configured as a hollow shaft, through which the output shaft 76 extends. It carries a gear 82 which is connected with a gear 84 of the front wheel drive shaft 86 that drives the front axle, not shown. The two drive shafts 76, 78 can be connected to each other by a clutch 88 so that the differential action of the Ravigneaux gearset 66 is suppressed.

Figure 2:
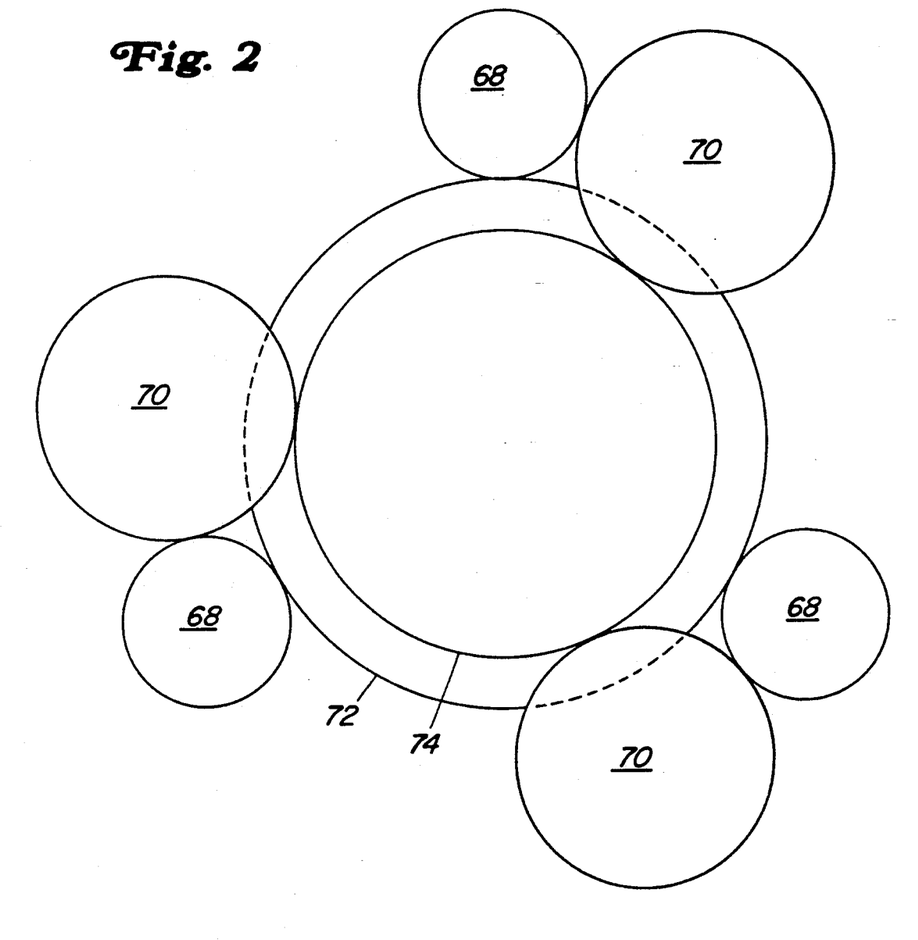
FIG. 2 shows a schematic cross section of a Ravigneaux gearset.

The engagement of the various gears of the Ravigneaux gearset 66 is shown in FIG. 2. The planet carrier, which is not detailed further, carries three long planet gears 68 and three short planet gears 70, free to rotate. The long planet gears 68 mesh with the larger sun gear 72 and the short planet gears 70 mesh with the smaller sun gear 74. Furthermore, the long planet gears 68 mesh with the short planet gears 70.

If the larger sun gear 72, for example, were rotated with the planet carrier 64 at rest, then the other, smaller sun gear 74 would be rotated in the opposite direction by means of the long planet gears 68 and the short planet gears 70. At the same time there would be an increase in rotational speed corresponding to the diameter ratio of the sun gears 72, 74. This mode of operation is what makes use of the Ravigneaux gearset as a differential gear possible.

When the Ravigneaux gearset 66 is driven through its planet carrier 64 there is a division of the torque applied to the output shafts 76, 78 of the two sun gears 72, 74 corresponding to the ratio of the diameters of the sun gears 72, 74.

Figure 3:
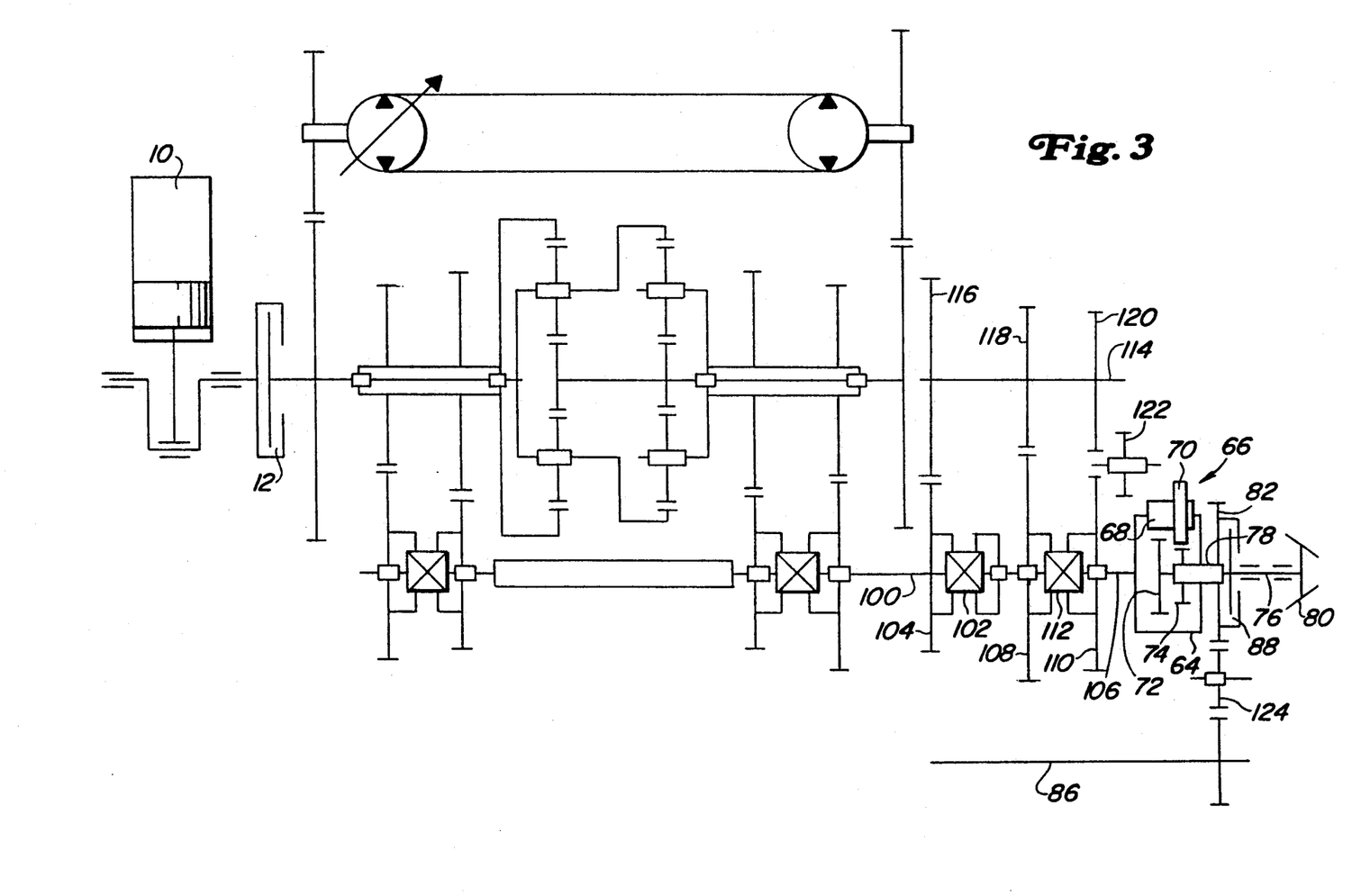
FIG. 3 shows a schematic view of a continuously variable shift gearbox with a following synchronized range gearbox and central differential.

The synchronized shifted gearbox of FIG. 1 is replaced in FIG. 3 by a continuously variable hydrostatic-mechanical power distributing drive. Such a drive has been described in detail in the German patent application, file number P 41 15 623.4 and will not be described further herein.

The output shaft of the hydrostatic-mechanical drive of FIG. 3 is simultaneously the input shaft 100 of a synchronized range gearbox. The gear 104 is rigidly connected to the shaft 100 and drives the intermediate shaft 114 through the gear 116. The shift sleeve 102 can alternately connect the output shaft 106 of the range gearbox with the input shaft 100 directly or indirectly through the intermediate shaft 114. The intermediate shaft 114 also carries fixed gears 118, 120, while the output shaft 106 carries two free gears 108, 110 which can be selectively connected by shift sleeve 112 to the output shaft 106. Fixed gear 118 meshes free gear 108 on the output shaft 106, while a reverse gear 122 is arranged between the other fixed gear 120 and the further free gear 110 on the output shaft 106.

The first shift sleeve 102 permits a shift between road range on the one hand and field or reverse range on the other. The second shift sleeve 112 permits a shift in the range gearbox between field range and reverse range.

The output shaft 106 of the range gearbox is connected to the planet carrier 64 of a Ravigneaux gearset 66. The Ravigneaux gearset 66 is arranged in the same way as that described in connection with FIG. 1, so further description here can be dispensed with. In contrast to FIG. 1, according to FIG. 3, an intermediate gear 124 is interposed between the gear 82 connected to the output shaft 78 of the smaller sun gear 74 and the gear 84 of the front drive shaft 86 by means of which the distance between the shafts 86 and 106 can be increased and the direction of rotation can be reversed.

Figure 4:
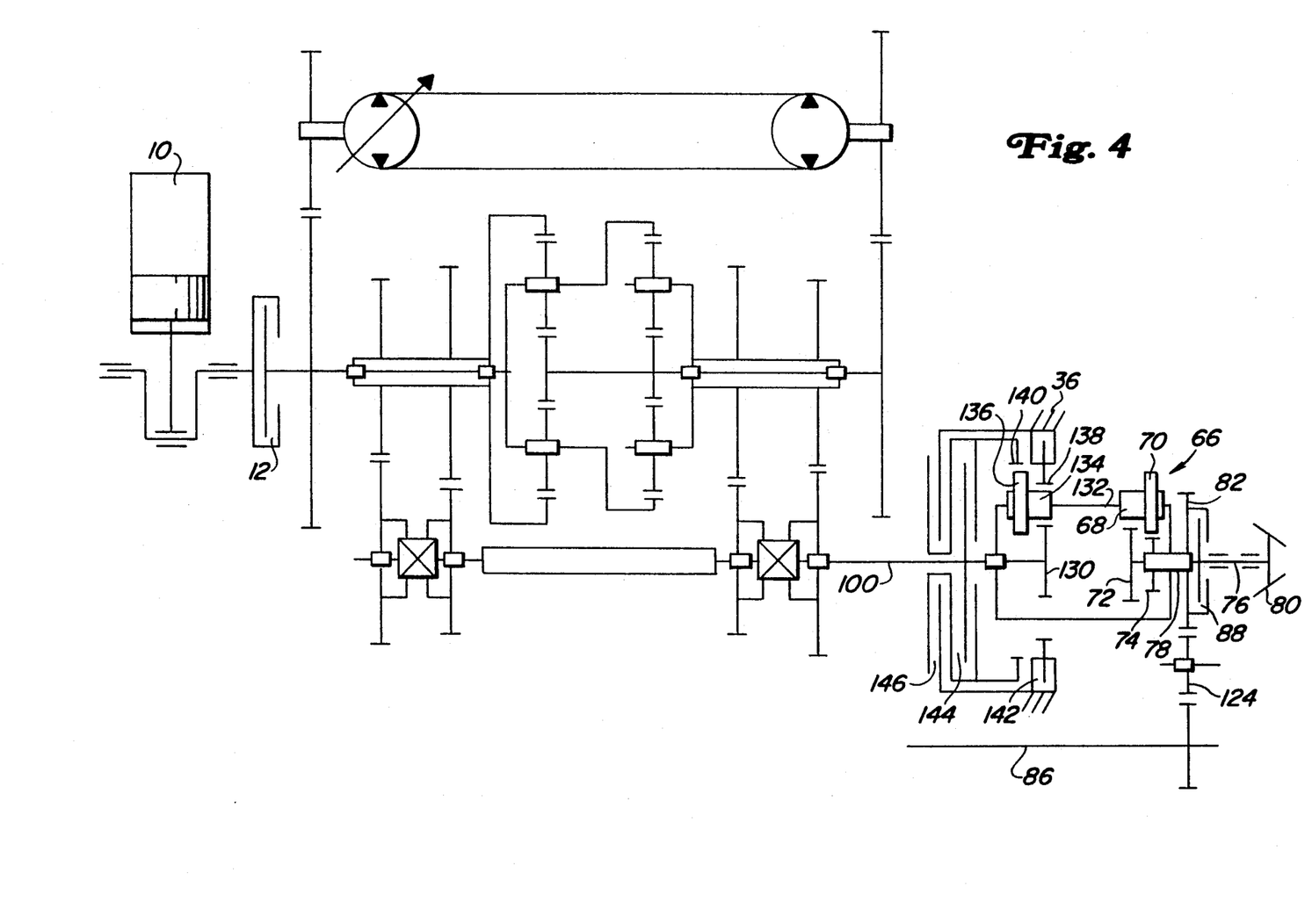
FIG. 4 shows a schematic view of a continuously variable shifted gearbox followed by combined range gearbox and central differential.

The vehicle transmission shown in FIG. 4 differs from the transmission shown in FIG. 3 in the arrangement of the range gearbox, which is configured here as a shifted planetary gearset. The core of this planetary gearset can be shifted under load by means of several clutches.

The output shaft 100 of the hydrostatic-mechanical drive carries the sun gear 130 of the shiftable gearset, fixed against rotation relative to the shaft 100. Furthermore a planet carrier 132 is supported on this shaft 100, free to rotate. The planet carrier 132 carries a set of long planet gears 134 and a set of short planet gears 136, each of which meshes with a ring gear 138, 140, respectively. The planet gears 134, 136 of a set mesh with each other in a fashion similar to that described in connection with FIG. 2.

The ring gear 138, which meshes with the set of long planet gears 134, can be locked by a brake 142 to the gearbox housing 36, while the ring gear 140, which meshes with the set of short planet gears 136, can be locked by a brake 146 to the gearbox housing 36. The ring gear 140, which meshes with the set of short planet gears 136, also can be connected by a clutch 144 to the input shaft 100.

If the clutch 144 is engaged while the brakes 142 and 146 are released, then the range gearbox 126 operates in block mode. This defines the road range. If the brake 142 is locked at the same time that the clutch 144 is disengaged and the brake 146 unlocked, the drive shifts from the road or reverse range into the field range. By locking the brake 146 and simultaneously disengaging the clutch 144 or releasing the brake 142 the drive shifts from the road or the field range into the reverse range.

The planet carrier 132 of the range gear box is coupled to the planet carrier 64 of the Ravigneaux gearset 66 which is operating as the central differential gear. Thus, this planet carrier is a combination part that carries the planet gears 68, 70, 134, 136 of both gearsets 66, 126.

Figure 5:
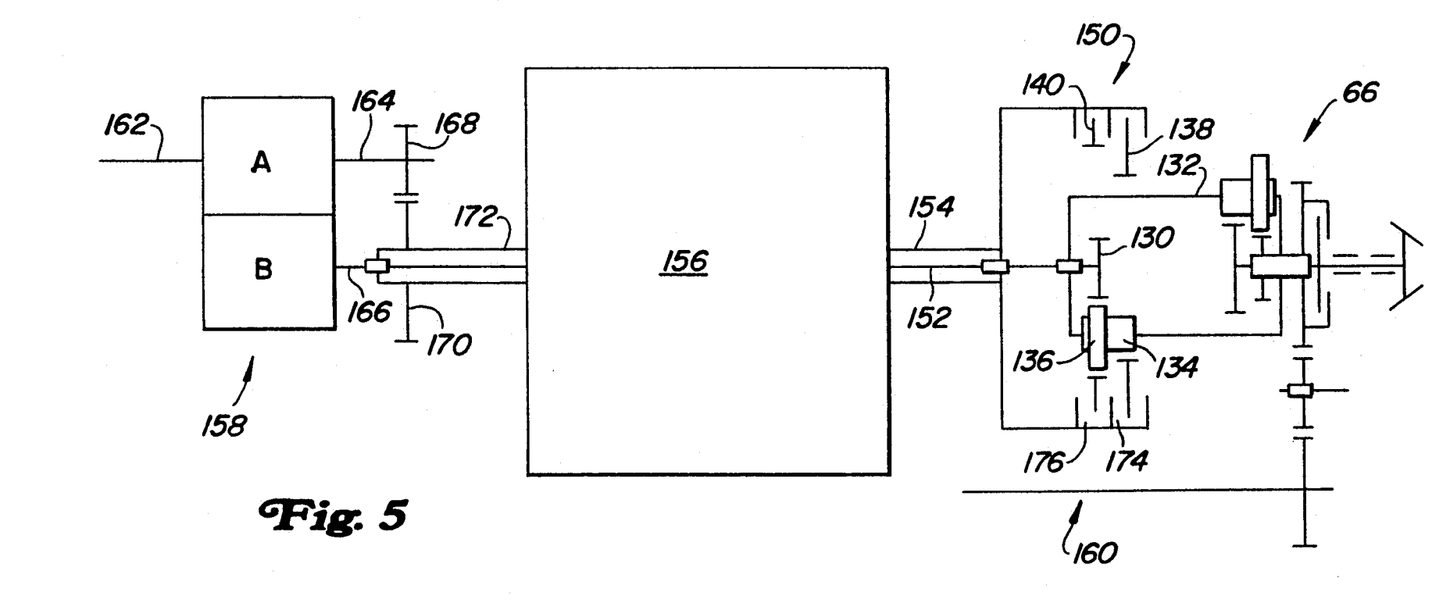
FIG. 5 shows a schematic view of an overlapping gearbox with two output shafts and following integrated range gearbox and central differential.

The vehicle transmission shown in FIG. 5 is similar to the drive shown in FIGS. 3 and 4, but differs from the transmissions described so far in that the range gearbox 150 is not driven by one input shaft (such as the shaft 100 in FIG. 4), but is instead driven by two input shafts 152 and 154. The rotational speeds of the input shafts 152, 154 result from an overlapping gearbox 156 that may be variously configured and that will not be described here in detail. Suitable examples would be the types of gearboxes described in FIGS. 3 and 4.

The overlapping gearbox 156 is located between the drive unit 158 and an output drive 160 formed by the range gearbox 150 and the central differential 66.

A significant fact in this case is the division in block A of the power of the engine carried in shaft 162 into a mechanical portion with generally constant rotational speed in the shaft 164 and a continuously variable portion that is preferably hydraulic which is carried in shaft 166. In this case the block A represent a hydraulic pump, and the block B a hydraulic motor. The continuous variation may, however, be accomplished by other means, such as a variable chain drive.

The shaft 164 drives the gear 168, so that the mechanical portion of the power is preferably transmitted at constant rotational speed from the shaft 164 through the gears 168 and 170 to the hollow shaft 172.

The portion of the power that is continuously variable in rotational speed is carried by the shaft 166. The mechanical and hydraulic portions of the power can be further converted in the overlapping gearbox 156, before they are again combined in the output drive 160.

In the road range a clutch 174 is engaged to connect the hollow shaft 154 with the ring gear 138, and the torques of the solid shaft 152 and the hollow shaft 154 are joined by the compound gearbox 150. The rotational speed is continuously variable and with equal speed on the hollow shaft 154 and solid shaft 152 the gearbox 150 operates in block mode. Thereby the two drive shafts 152 and 154 replace the clutch 144 of FIG. 4.

When a clutch 176 is engaged to connect the hollow shaft 154 with the ring gear 138 and the clutch 174 is disengaged the result is a second range of gear ratios. The rotational speed of the shaft 154 is generally constant, while that of the shaft 152 is variable, so the two ranges result from subtraction or addition of rotational speed with respect to the common coupling point.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle transmission comprising:
   a front and rear drive shafts;
   a speed control arrangement for receiving power;
   a Ravigneaux gearset differential having two co-axial sun gears, a planetary carrier and two sets of planetary gears, each planetary gear meshing with both a planetary gear of the other set of planetary gears and one of said sun gears, with the planetary carrier receiving power from the speed control arrangement;
   the front drive shaft fixed for rotation with one of said sun gears;
   the rear drive shaft fixed for rotation with the other one of said sun gears; and
   a clutch for locking the said differential by selectively fixing said sun gears for rotation with one another.

2. A vehicle transmission according to claim 1, wherein the relative sizes of said sun gears are such that the output drive to the front drive shaft has an overrun of 2% to 5% relative to the output drive to the rear drive shaft when the differential is locked.

3. A vehicle transmission according to claim 1, wherein said clutch is designed as a torque-limiting clutch for the front drive shaft.

4. A vehicle transmission according to claim 1, wherein the relative sizes of the sun gears are such that the division of torque between the front drive shaft and the rear drive shaft is in the ratio of approximately 35 to 65.

5. A vehicle transmission according to claim 1, wherein the speed control arrangement comprises at least one shiftable planetary gearset whose gear ratio can be changed.

6. A vehicle transmission according to claim 1, wherein the speed control arrangement comprises at least one planetary gearset configured as a compound range gearbox with two inputs which can be shifted between at least two gear ratios.

7. A vehicle transmission according to claim 5, wherein the shiftable planetary gearset and the Ravigneaux gearset of the differential are integrated with each other and share at least one common component.

8. A vehicle transmission according to 7, further comprising a gearbox housing in which said shiftable planetary gearset is mounted and wherein the shiftable planetary gearset comprises a driven sun gear, two ring gears and a planet carrier configured as an output drive and which carries two sets of planet gears, with a first brake provided for one of said ring gears and the gearbox housing and a clutch between the sun gear and the other is said gear in order to shift between two gear ratios.

9. A vehicle transmission according to claim 8, further comprising a second brake for said other ring gear.

* * * * *

UNITED STATES PATENT AND TRADEMARK OFFICE
CERTIFICATE OF CORRECTION

PATENT NO. : 5,269,732
DATED : 14 December 1993
INVENTOR(S) : Heinz Weiss et al.

It is certified that error appears in the above-indentified patent and that said Letters Patent is hereby corrected as shown below:

On title page, item [54] and col. 1, line 1, delete "RAVIGNEAUX"

In Col. 8, line 33, delete "compound".

Col. 8, line 46, delete "and".

In Col. 8, line 48, replace "is" with -- of --;and after "said", insert -- ring --;and delete "gear" and insert -- gears --.

Signed and Sealed this

Twenty-fourth Day of May, 1994

Attest:

BRUCE LEHMAN

*Attesting Officer*  *Commissioner of Patents and Trademarks*